July 20, 1965  R. H. CARLSON  3,196,300
MOTOR HOUSING
Filed March 5, 1962  2 Sheets-Sheet 1
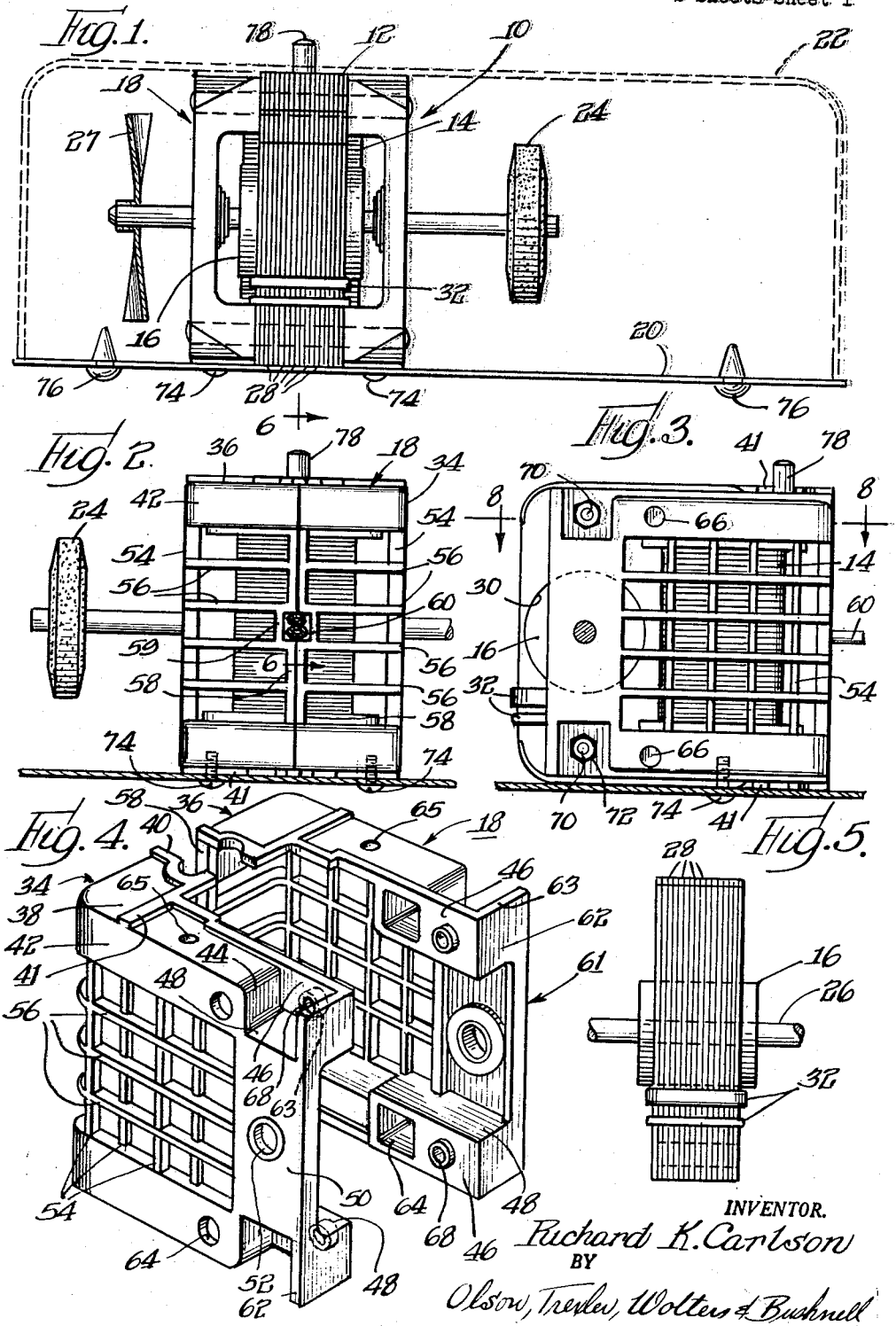
INVENTOR.
Richard K. Carlson
BY
Olson, Trexler, Wolters & Bushnell
attys

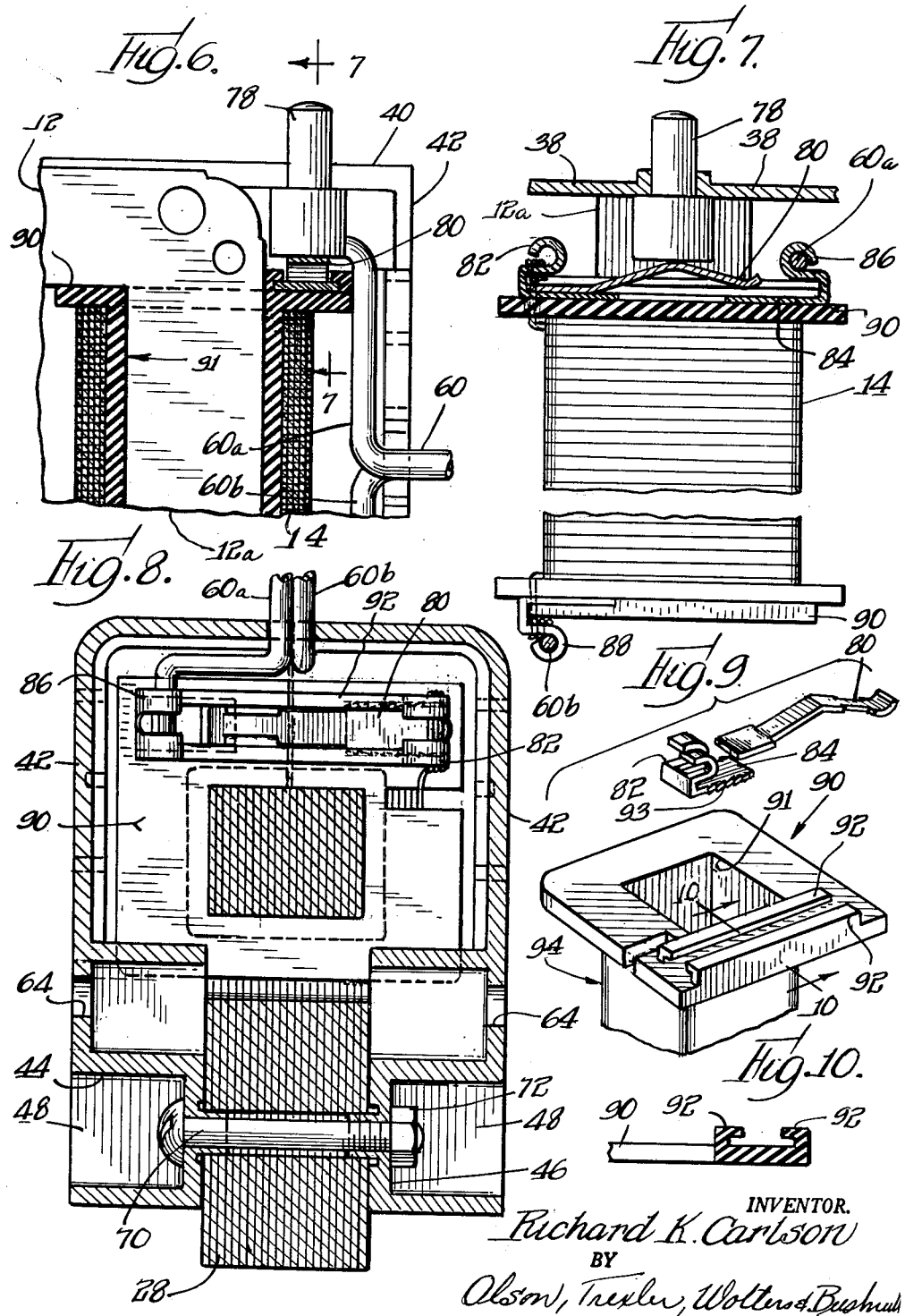

United States Patent Office 3,196,300
Patented July 20, 1965

3,196,300
MOTOR HOUSING
Richard H. Carlson, Chicago, Ill., assignor to G-M Laboratories Inc., Chicago, Ill., a corporation of Illinois
Filed Mar. 5, 1962, Ser. No. 177,336
4 Claims. (Cl. 310—89)

This invention relates to an electric motor construction, and particularly to an improved housing therefor.

Small electric motors are widely used in domestic appliances. In many installations where high power and high torque are not required, it is common to use shaded-pole induction motors. This is sometimes done to take advantage of the characteristics of shaded-pole motors, and it is sometimes done due to the low initial cost of such motors, and the complete freedom of upkeep. Shaded-pole motors are electrically relatively inefficient, and therefore tend to have a relatively high temperature rise for the size of the motor.

Frequently small electric appliances, including those using shaded-pole motors, incorporate attractive housings molded of plastic materials. Some such plastic materials will burn, and most are susceptible to mechanical breakage. In the event of mechanical failure of the housing, as through burning or breakage, it is necessary that the enclosed parts be electrically safe.

In the past, it has been common practice to wrap tape on the windings and on the terminals of small electric motors used in domestic appliances. Unfortunately, such tape inhibits cooling, whereby the temperature rise for a motor of given size is greater for a taped motor than for one with a bare stator winding.

The Underwriters Laboratories has established standards of appliance construction to be adhered to by manufacturers desiring the benefit of the Underwriters' seal. These standards specify that when an electric motor for an appliance is enclosed within a plastic housing, the windings on the stator coil and also the terminals must be taped or otherwise protected, or that the plastic housing be constructed of plastic materials which will not burn, i.e., such materials must be self-extinguishing. Self-extinguishing plastic materials are generally relatively quite high priced. This is obviously undesirable in highly competitive markets.

Accordingly, it is an object of this invention to provide an improved cage or guard for a small electric motor protecting both the stator winding and the terminals against accidental engagement, irrespective of the protection that might or might not be afforded by an external housing, as of an appliance.

It is another object of this invention to provide an improved cage or guard for a small electric motor affording full convective cooling.

It is another object of this invention to provide a cage or guard for a small electric motor providing additional surfaces for convective cooling, and also providing a certain amount of cooling by conduction and radiation.

It is yet another object of this invention to provide a cage or guard for a small electric motor which cage provides the mechanical structure for a switch for the motor.

Since the present motor cage construction affords improved cooling, the temperature rise for a given motor is considerably less than that of an equivalent motor with taped windings. Alternatively, for a given permitted temperature rise, the amount of copper in the stator winding can be reduced rather substantially, thereby affording a more economical construction.

Other and further objects and advantages of the present invention will be understood from the following description taken in connection with the accompanying drawings wherein:

FIGURE 1 is a front elevational view of an electric motor made in accordance with the principles of the present invention, a housing defined by broken lines being shown enclosing the motor;

FIG. 2 is a rear elevational view of the motor shown in FIG. 1;

FIG. 3 is a side view of the electric motor;

FIG. 4 is a perspective view on an enlarged scale of the cage-like motor frame of the present invention;

FIG. 5 is a front elevational view of the stator and rotor assembly of the electric motor in FIG. 1;

FIG. 6 is a greatly enlarged, fragmentary sectional view taken in the direction of the arrows along the line 6—6 in FIG. 2;

FIG. 7 is a sectional view taken in the direction of the arrows along the line 7—7 in FIG. 6, certain additional parts being illustrated for purposes of clarity;

FIG. 8 is a horizontal sectional view on an enlarged scale taken in the direction of the arrows along the line 8—8 in FIG. 3;

FIG. 9 is an exploded perspective view of a switch construction embodied in the electric motor of FIG. 1; and FIG. 10 is a fragmentary sectional view taken in the direction of the arows along the line 10—10 in FIG. 9.

There is shown in FIG. 1 of the drawings a motor generally designated 10 made in accordance with and embodying the principles of the present invention. As shown, the electric motor 10 is a single phase, induction motor of two pole construction employing shading coils to induce a revolving magnetic field in a manner well known in the electric motor arts, commonly called a shaded pole motor.

Considering the structure in detail, the electric motor 10 includes a stator 12 having a main coil 14, and a rotor 16 mounted in and rotatably supported by a box shaped, cage-like frame 18. In FIG. 1 the above motor elements are shown mounted upon a planar base member 20 which forms the bottom wall for a plastic housing 22 (shown in phantom lines) of a knife sharpener. The housing 22 may be constructed of non-self-extinguishing plastic material. A grinding wheel 24 is mounted on one end of a rotor shaft 26, and a sheet metal fan 27 is mounted on the other end of the shaft.

The stator 12, shown best in FIGS. 1 and 5, is of conventional construction and configuration, including a plurality of flat, iron laminations 28. As shown in FIG. 3, the energizing winding or coil 14 is wound about one leg of the core formed by the laminations 28. A circular shaped cutout or aperture 30 is provided in the laminations 28 opposite the main coil 14 for receiving the rotor 16.

The rotor is of the usual squirrel cage type commonly used in shaped pole motors, employing aluminum bars cast integrally with the rotor laminations in a manner well known in the art. The rotor is provided with the usual rotor shaft 26. Shading coils 32 are secured to the stator 12 adjacent the rotor 16 to create a revolving field in accordance with the usual practice.

Although in other motors of this type the main coil winding is usually wrapped with insulation tape which tends to increase the temperature rise in the stator, in general, and in the coil winding in particular, in the present motor, the coil winding 14 is not so wrapped but remains bare. To afford protection for the stator winding 14 as well as to maintain a flow of air thereto, the cage-like frame 18 is operatively secured to the stator laminations 28. More particularly, the frame 18 consists of two identical half sections 34 and 36. Being made of a die cast zinc material or the like, the frame halves 34, 36 may be manufactured inexpensively to close tolerances. For purposes of this disclosure only the left (as seen in FIG. 4) frame element 34 will be described in detail.

Referring particularly to FIG. 4, the frame element 34 comprises a substantially L-shaped, solid top panel 38 having a raised bead or rim 40 along the inner periphery thereof. A rib 41 extends transversely of the bead 40 across the panel 38. A solid side apron 42 extends down from the outer edge of the top panel 38 and terminates towards the forward portion of the section 34 in a downwardly extending wall 44 which is joined at the innermost part thereof to a wall 46 contiguous with the rim element 40. A horizontally disposed panel element 48 is mutually joined at right angles to the elements 44 and 46 thereby providing a shell-like indentation in the frame element 34. Extending downwardly at a right angle from the panel 48 is a rectangular and somewhat elongated panel member 50 having an inserted bearing 52.

Inasmuch as the left-hand frame half 34 is symmetrical about a mid-plane extending through the center of the bearing 52, elements (not shown) similar to elements 38, 40, 42, 44, are also disposed below such mid-plane corresponding to those disposed above.

Interconnecting the top and bottom solid portions of the frame 34 is a plurality of vertically extending thin ribs or fins 54. A plurality of horizontally disposed bars 56, each of which is rectangular in transverse cross section and L-shaped in general form, is perpendicular to and interconnects the ribs or fins 54. The bars 56 extend from the panel 50 parallel to the plane of the surface 38 and terminate in the rear side of the element 34, shown best in FIG. 2. Interconnecting the ends of the bars 56 at the rear side is a vertically arranged strut 58 which extends between the top portion and bottom portion of the element 34. At the mid-plane of the element 34 an offset 59 is provided in the strut 58 to afford an opening for an electric power lead 60 when the two frame halves 34, 36 are bolted to the stator laminations 28. A suitable knot may be provided in the cord, or a suitable fitting may be provided thereon inwardly of the opening to prevent strain from being imposed on the terminal fittings.

Referring again to FIG. 4, a C-shaped flange 62 is arranged at a right angle to the panel 50 to provide stiffening at the forward portion of the frame half 34 to maintain rigidity in the panel 50. The panel 50, flange 62, and panels 44, 46 and 48 form a bearing bracket 61. The flange 62 has upper and lower extension walls 63 having edges coplanar with the ribs 40 and 41 to form a mounting base for the motor. Holes 65 are provided in the panels 38 for receipt of sheet metal or self tapping screws for mounting the motor.

Apertures 64 are provided in the aprons or side panels 42 for receipt of screws or bolts when the motor is to be mounted with the shaft perpendicular to a mounting panel. A second aperture 68 is provided in each of the vertical panels 46. When aligned, the second apertures 68 are adapted to receive machine screws 70 (shown in FIGS. 3 and 8) which accommodate nuts 72 threadably engaged on the ends thereof. The fasteners 70 are provided extending through the frame 18 and stator 12 so as to afford clamping engagement of the frame halves 34 and 36 to the stator adjacent to the rotor cage 30. Alternatively, rivets may be used for this purpose.

Such bolting or riveting together of the stator and cages insures accurate positioning of the bearings relative to the stator whereby fixed bearings may be used instead of the more expensive self-aligning bearings. Preferably, the bearings are narrow axially of the shaft.

To secure the electric motor 10 to the base member 20 two self-tapping screws 74 are passed through the base 20 and are threaded into the holes 65 in the bottom solid panel 38. Pairs of resilient yieldable feet 76 preferably are disposed on the base member 20 to insulate the motor 10 and housing 22 from the supporting surface (not shown) thereby to eliminate transmitting vibrations thereto and to prevent skidding of the device on a supporting surface.

Switching means are enclosed by the frame 18 in a manner whereby exposed terminals may be employed therein without hazard. Referring to FIGS. 6–10 more specifically, the switching means includes a plunger button 78 which projects through a complementary aperture in the mated frame halves 34, 36 from within an enclosed switch compartment in the top portion of the frame 18. The plunger 78 is supported within the switch compartment by a cantilevered leaf spring 80 secured to a first terminal 82 in clamping engagement therewith (see FIG. 9). The free end of the leaf spring 80 is disposed above and normally out of contact with a base portion 84 (FIG. 7) of a second terminal 86. The second terminal 86 has a gripping portion fixedly disposed above the base 84 and adapted to receive one conductor 60a of the single phase, two conductor line 60. The other conductor, 60b, is electrically connected to a third terminal 88 arranged at the bottom portion of the motor winding 14. It is to be appreciated that the winding 14 is connected to the terminal 88 and to the first terminal 82 thereby to maintain a circuit continuity among the terminals 82, 86, and 88.

Electrically to insulate the switch means from the stator 12 and the motor winding 14, the first and second terminals 82, 86, which are of identical construction are operatively mounted on an insulation plate 90 forming an end flange of a bobbin 94. The plate 90 is generally rectangular in form and has a substantially square central aperture 91 received over one leg, 12a, of the stator 12. A spaced pair of elongated overlying flanges 92 L-shaped in cross section, extends along the plate top plate 90 adjacent one edge thereof, to provide a channel for receiving the base portions of the terminals 82 and 86, best shown in FIGS. 8, 9. Each of these base or terminal portions has a serrated edge 93 to prevent retraction thereof. It is to be recognized from the foregoing that when the plunger 78 is depressed the leaf spring 80 contacts the base 84 of the second terminal 86 thereby to effect an electrical connection between the first terminal 82 connected to the winding of the coil 14 and the line wire 60a. As the spring 80 continues to flatten out after initial engagement with the base 84, a wiping action is effected between the spring 80 and base 84, insuring excellent electric equipment. When the button 78 is released, the resiliency in the spring 80 returns it to the normal position spaced from the base 84 of the second terminal 86, thereby to open the electrical circuit between the line 60 and the main winding 14.

Referring now to FIG. 8, the insulating plate 90 has a width substantially equal to the inner width of the frame 18 whereby the plate 90 provides a floor for the switch compartment within the frame 18. The remaining elements of the compartment are defined by the apron-like sidewall 42 and the top panel 38, best shown in FIGS. 6, 7. It is also to be appreciated that the insulating plate 90 forms an abutment for the motor winding 14 thereby insulating the winding from the switch compartment. Similarly, a plate or flange 90 is provided on the lower end of the bobbin. The frame 18 being symmetrical about a horizontally disposed mid-plane, it follows that a similar compartment is disposed in the lower section of the frame 18. However, in the lower compartment there is only the third terminal 88 which receives the line element 60b. By this arrangement of enclosed switch compartments, bare terminals may be employed rather than the encapsulated or tape wound terminals that have heretofore been required.

From the foregoing, it will be seen that the cage herein disclosed does not inhibit circulation of air about the motor, whereby the motor is cooled by natural convection and by air directed by the fan 27, furthermore, since the cage is clamped against the stator laminations, it will conduct heat away from the stator; such conducted heat is then dissipated from the cage, particularly the fin-like bars 54 and 56, by convection and by radiation.

In this connection, it will be appreciated that the motor and cage together provide a much larger area for heat loss than does the bare motor alone.

A 70° F. heat rise is permissible in a motor of the type herein disclosed in the environment described. Such a temperature rise does not inherently result in any danger. However, a short circuit could result in burning off the plastic housing. In a conventional motor, it could also result in burning off tape from the windings or terminals. In the present construction, even a rather extensive fire would leave the metal cage intact, whereby there would be no electrical danger.

Higher reliability is obtained with the present terminals since the terminals are crimped and no solder is required. The terminals are particularly adapted for automation. Nevertheless, they are completely inaccessible, and hence are electrically safe. Furthermore, the terminals and switch are isolated from the winding by the bobbin flanges coacting with the cage to form terminal sub-housings. Simultaneously, mechanical structure for the on-off switch is provided.

As a further benefit, all of the foregoing is provided at an extremely low cost.

While there has been described what is at present considered the preferred embodiment of the invention, it will be understood that various modifications may be made therein, and it is intended to cover in the appended claims all such modifications as fall within the true scope and spirit of the invention.

The invention is hereby claimed as follows:

1. An electric motor construction for mounting within a housing susceptible to breaking or fire damage comprising a stator assembly including a laminated ferro-magnetic stator and at least one coil of wire wound on a bobbin of insulating material on said laminated ferro-magnetic stator, said coil being non-wrapped and thereby free for heat transfer from said wire to the air surrounding said coil, a rotor assembly, and frame means of fire resistant and breakage resistant metal fixed relative to said stator assembly and rotatably supporting said rotor assembly in operative relation to said stator assembly, said frame means engaging said ferro-magnetic stator with at least a portion of said stator extending from said frame means for radiation of heat from said stator, said frame means being in intimate contact with said stator to facilitate conduction of heat therefrom, said frame means including a highly perforated enclosure around said coil having a plurality of perforations through a major portion of the surface thereof and in proximity to said coil and thereby facilitating air flow to and from said coil, said frame means preventing contact by a user with said wire in the event of absence of or damage to said housing.

2. An electric motor construction as set forth in claim 1 wherein said frame means comprises two similar half sections each of rectangular cup-shape symmetrically disposed with respect to said stator assembly and said rotor assembly.

3. An electric motor construction as set forth in claim 2 and further including electrical switch means connected to said terminals in series with said coil supported by said bobbin within said frame means and protected by said frame means against contact by a user, said switch means further including a switch actuator supported by said metal frame means.

4. An electric motor construction as set forth in claim 1 wherein said laminated ferro-magnetic stator is rectangular, and wherein said stator extends from said frame means on three sides.

References Cited by the Examiner
UNITED STATES PATENTS

| | | | |
|---|---|---|---|
| 2,119,986 | 6/38 | Dremel | 310—50 |
| 2,181,418 | 11/39 | Cohen | 310—43 |
| 2,264,033 | 11/41 | Youhouse | 310—50 |
| 2,449,021 | 9/48 | Stahl | 310—43 |
| 2,662,194 | 12/53 | Jepson | 310—50 |
| 2,670,447 | 2/54 | Harmon | 310—89 X |
| 2,709,228 | 5/55 | Miller | 310—43 |
| 2,752,514 | 6/56 | Schwenden | 310—50 |
| 2,822,781 | 2/58 | Burton | 310—89 X |
| 2,899,655 | 8/59 | Forte et al. | 336—198 |
| 2,965,774 | 12/60 | Rangus | 310—89 X |
| 3,121,813 | 2/64 | Pratt | 310—50 |

MILTON O. HIRSHFIELD, *Primary Examiner.*